United States Patent [19]

Stark et al.

[11] Patent Number: 4,773,061
[45] Date of Patent: Sep. 20, 1988

[54] CARRIER FOR DATA STORAGE DISK

[75] Inventors: Daniel J. Stark, Rochester; Dwight J. Petruchik, Rush; Charles J. Bernitt, Rochester; Bruce J. Semmler, Spenceport, all of N.Y.

[73] Assignee: Eastman Kodak Company, Rochester, N.Y.

[21] Appl. No.: 923,509

[22] Filed: Oct. 27, 1986

[51] Int. Cl.[4] .................. G11B 17/04; G11B 23/02; B65D 85/57
[52] U.S. Cl. .................................. 369/291; 369/77.2; 206/309; 206/312; 206/444
[58] Field of Search ............... 369/77.2, 291; 206/309, 206/312, 444; 360/132, 133

[56] References Cited

U.S. PATENT DOCUMENTS

| | | | |
|---|---|---|---|
| 4,266,784 | 5/1981 | Torrington | 360/133 X |
| 4,433,410 | 2/1984 | Siryj et al. | 206/312 X |
| 4,436,201 | 3/1984 | Inaba | 206/312 X |
| 4,476,978 | 10/1984 | Saito | 360/133 X |
| 4,481,617 | 11/1984 | Mabry | 369/77.2 |
| 4,617,655 | 10/1986 | Aldenhoven | 369/291 |

Primary Examiner—David Werner
Attorney, Agent, or Firm—Warren W. Kurz

[57] ABSTRACT

Disclosed herein is a carrier for a data storage disk. Such carrier comprises means for releasably capturing a disk so that it may be removed by a suitable disk release mechanism and used at a location spaced from the carrier, thereby avoiding any potential for disk damage due to contact with the carrier during disk rotation, and avoiding the need to precisely locate the carrier with a disk drive unit. Preferably, the carrier features enabling disk release are located so the disk release can be effected by the same disk-releasing mechanism no matter which of four different orientations the disk carrier has when inserted into the disk drive unit.

6 Claims, 5 Drawing Sheets

CARRIER FOR DATA STORAGE DISK

BACKGROUND OF THE INVENTION

This invention relates to the field of data recording/playback and, more particularly, to apparatus for facilitating the handling and transport of data storage disks, e.g. optical and magnetic hard disks.

The desirability of handling high density data storage disks without contacting their delicate data recording surfaces is manifest. With this in mind, it is known, for example, to rotatably mount such disks in rigid cartridges from which they are never removed, even during periods of use. See, for example, the protective cartridge disclosed in U.S. Pat. No. 4,433,410. Such a cartridge includes a plurality of spring-loaded latches which engage the enclosed disk at spaced locations about the disk periphery. Such latches are intended to precisely locate the disk within the cartridge so that it may be reliably positioned relative to a rotatable spindle in a disk drive, and to prevent the disk from shifting laterally or axially within the cartridge and thereby contacting the cartridge walls. During use of the disk tapered pins, associated with the disk drive unit, are moved in a direction to engage and release the spring-loaded latches, displacing such latches to a position which permits unimpeded disk rotation.

Protective cartridges of the above type are particularly useful in carefully controlled environments where dust and other contaminating substances are not present. However, because such cartridges must be provided with a relatively large central opening through which a disk drive spindle can enter the cartridge and rotatably drive the disk within, such cartridges can give rise to contamination problems in less controlled environments.

To avoid the contamination disadvantages of cartridges of the above type, it is also known in the art to house high density data storage disks in rigid jackets or caddies which allow removal of the disk only after the caddy has been accepted into the controlled environment of a disk drive unit. See, for example, the protective optical disk package disclosed in U.S. Pat. No. 4,352,174. Here, the disk drive unit comprises a mechanism for entering the disk's protective jacket and physically gripping the disk so that when the jacket is withdrawn from the disk drive unit, the disk is retained within the drive unit. To assure reliable gripping of the disk, the periphery is provided with a raised bead which can be more readily engaged.

As another means for facilitating the removal of a data storage disk from its protective jacket or caddy, as well as to facilitate the subsequent handling of such a disk, it is known to capture the disk at its periphery by a so called "disk carrier." Such a device typically comprises a rigid, planar frame, often generally rectangular in shape, having a circular aperture slightly larger in diameter than that of the disk. A plurality of radially extending tabs extend inwardly from the aperture wall and support the disk at spaced locations around the disk periphery. See, for example, the disk carriers disclosed in U.S. Pat. Nos. 4,419,060 and 4,481,617. Such disk carriers are normally totally enclosed by a protective caddy, and removal of the disk from the caddy is achieved by engaging and withdrawing the disk carrier.

In disk carriers of the above type, there is, by necessity, a relatively loose fit between the disk and the disk-capturing features of the carrier. This loose fit is necessitated by the fact that the disk is intended to rotate within the carrier frame. During use, the carrier is precisely located relative to a disk drive spindle so that the disk can be rotatably driven without contacting any of the carrier's disk-capturing features. Obviously, to assure non-contact between the disk and carrier during disk rotation, the disk must have a certain amount of freedom to move both axially and laterally within the carrier frame. Such freedom of movement is potentially harmful to a captured disk, particularly to those disks of a more fragile nature. Moreover, such carriers cannot precisely locate their captured disk relative to the axis of rotation of a drive spindle. No matter how precisely the carrier is located within the disk drive unit, the lateral position of the disk can vary substantially, due to its freedom to move within the carrier frame. Thus, the disk drive unit must be capable of accepting a disk which is substantially displaced from a desired axis of rotation.

SUMMARY OF THE INVENTION

In view of the foregoing, an object of this invention is to provide an improved carrier for a data storage disk, a carrier which is improved from the standpoint that it is capable of securely capturing the disk in a precise position relative to the carrier's structure, yet is capable of readily releasing the disk for use at a location substantially spaced from the carrier.

Another object of this invention is to provide an improved disk carrier in which certain features for releasing the disk from a securely captured position are arranged so as to have two axes of symmetry, whereby the disk carrier can be inserted into the disk drive in any one of four different orientations.

Another object of this invention is to provide an improved disk carrier which is capable of releasing a securely captured disk without substantial displacement of the disk.

Like similar prior art devices, the disk carrier of the invention comprises a planar frame having a wall defining a circular aperture for receiving a data storage disk, the diameter of the aperture being slightly greater than the disk diameter, and means for retaining the disk within such aperture so that the disk and frame are substantially coplanar. What sets the disk carrier of the invention apart from prior art devices are the particular characteristics of such retaining means. According to the invention, such retaining means comprises disk support means extending rigidly from the aperture wall of the carrier for supporting a disk received within the aperture and urged into contact therewith; and releasable latching means movably mounted on the carrier frame for selectively engaging a disk located in the carrier aperture and for urging such disk into engagement with the disk support means. Preferably, the carrier frame is provided with a structure which is engagable by a disk-releasing mechanism associated with a disk drive unit for shifting the position of the carrier in a direction to release the disk from the disk support means while such disk-releasing mechanism operates to move the latching means to a non-latching position, out of engagement with a disk, whereby the disk is freed from the carrier without substantially altering the position of the disk. In a particularly preferred embodiment, such disk retaining means and disk-releasing structure are arranged on the carrier so as to be engagable by the disk-releasing mechanism, regardless of which of four different orientations the disk is presented to the release mechanism.

The invention and its various advantages will become more apparent to those skilled in the art from the ensuing detailed description of preferred embodiments, reference being made to the accompanying drawings.

DETAILED DESCRIPTION OF PREFERRED EMBODIMENTS

Figure 1:
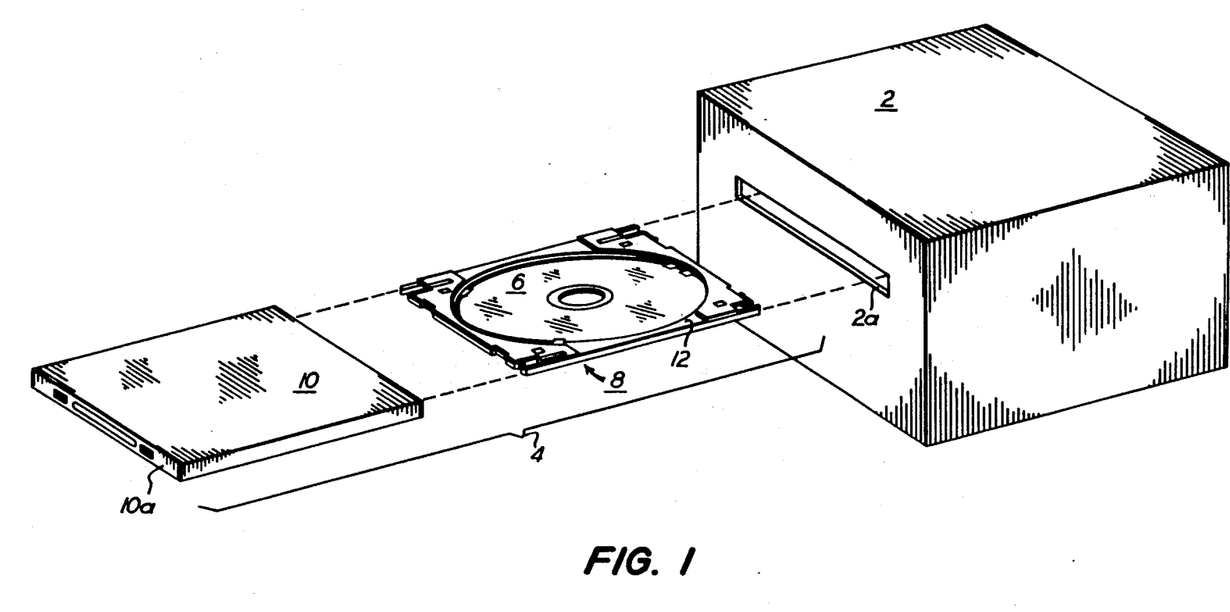
FIG. 1 is a perspective illustration of a data recording/playback system.

Referring now to the drawings, FIG. 1 illustrates a data recording/playback system comprising a disk drive unit 2 and a data storage disk assembly 4. The latter basically comprises a rigid data storage disk 6, a disk carrier 8 and a protective caddy 10. As explained below, disk carrier 8 serves to releasably capture disk 6 so that the disk is accurately and securely registered within the carrier structure, yet is capable of being readily removed from the carrier for rotation in a plane spaced from the carrier. When not in use, the carrier and its captured disk are positioned within the protective caddy, the latter being sufficiently rigid to guard against contact with the disk's recording surfaces. In use, the carrier-loaded caddy is inserted into the disk drive unit through a door 2a. Upon entering the disk drive unit, a mechanism within serves to extract the disk carrier from the caddy and to return the caddy to the user. The disk drive unit also includes apparatus for releasing the disk from its carrier and for loading the disk onto a drive spindle assembly for rotation. Such apparatus is disclosed in detail in the commonly assigned U.S. application Ser. No. 923,508, filed concurrently herewith in the name of Dwight Petruchik, and only those elements which cooperate directly with the disk carrier of the invention are described herein.

Figure 2:
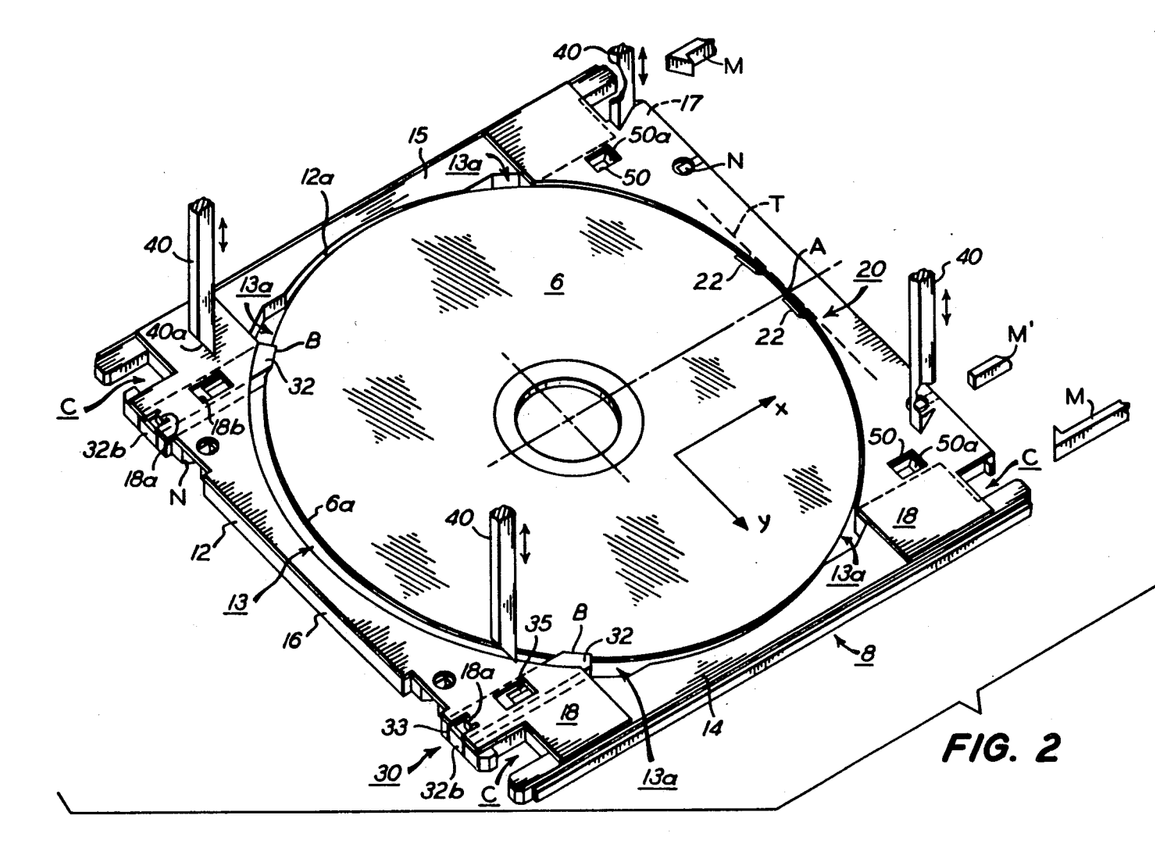
FIG. 2 is a perspective view of a disk carrier structured in accordance with a preferred embodiment.
Figure 3:
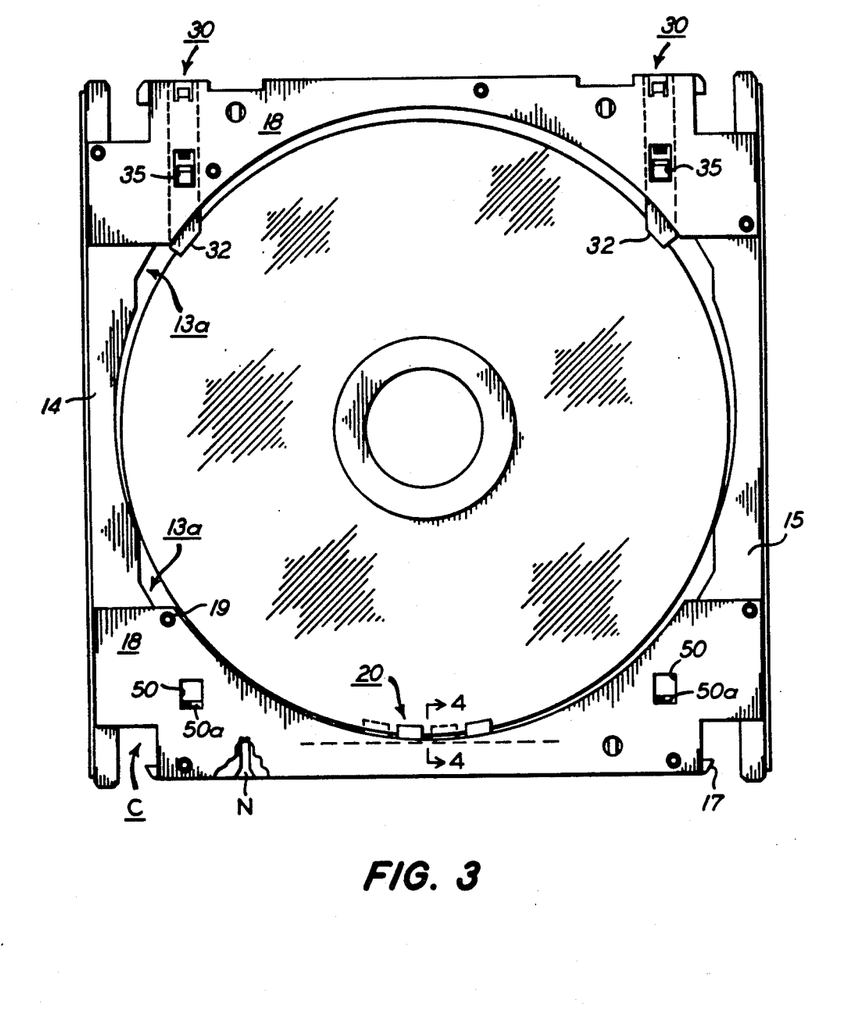
FIG. 3 is a top plan view of the carrier shown in FIG. 1.

In FIGS. 2 and 3, carrier 8 is shown to comprise a planar frame 12 having a wall portion 12a which defines a generally circular aperture 13 for receiving the rigid data storage disk 6. As shown, the diameter of aperture 13 is slightly larger than the disk diameter to readily accomodate the disk. Further, the generally circular aperture 13 has four expanded regions 13a which accomodate certain disk supporting members (not shown) of the disk drive unit which serve to support the disk upon release from the carrier. In addition to certain disk latching and unlatching features, described below, the carrier frame is also provided with certain cutouts C and notches N in its leading and trailing edges (as determined by the direction in which the carrier is inserted into the disk drive unit) which cooperate with a carrier locating mechanism (M, M') within the disk drive unit for precisely locating the carrier with respect to a desired axis of rotation. As a result of the geometry of such cutouts and notches, the carrier can be inserted into the disk drive unit in any one of four different orientations.

To facilitate carrier manufacture, it is preferred that frame 12 comprise various discrete elements which are mechanically coupled to provide the frame configuration shown. Such elements may comprise, for example, a pair of opposing side rails 14, 15 and end members 16, 17, all of which can be made of plastic (e.g. polycarbonate) and injection molded to produce the shapes shown. A plurality of sheet metal plates 18, e.g. made of aluminum, and suitable fasteners 19 serve to connect elements 14–17 in the manner shown.

As indicated above, carrier 8 comprises disk retention means for accurately positioning and releasably capturing a disk within the plane of the carrier frame. Such disk retention means comprises disk support means 20 for engaging and supporting a disk which is urged into contact therewith at a first location (A) along the disk periphery, and releasable latching means 30 which is adapted to selectively engage a disk at one or more other locations (B) along the disk periphery and to urge such disk into engagement with the support means 20.

Figure 4:
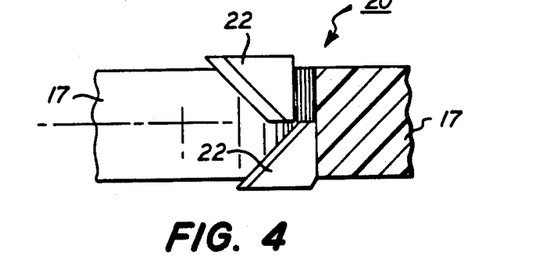
FIG. 4 is a cross sectional view of the FIG. 2 apparatus taken along the section line 4—4.

According to a preferred embodiment, disk support means 20 comprises a plurality of stationary support tabs 22 which are mounted on and extend angularly from, the aperture-defining frame wall 12a. Such tabs, as best shown in FIG. 4, cooperate in supporting a disk, when urged into engagement therewith, from both sides. Preferably, tabs 22 support the disk periphery of a relatively short angular arc of approximately 15°. The length of such arc is a trade-off between providing a secure support and facilitating release of the disk without substantial displacement of the carrier frame, as described below. Preferably, the tabs 22 are integral with wall 12a, being formed by the injection molding process used to fabricate the carrier frame's leading end element 17.

Figure 5A:
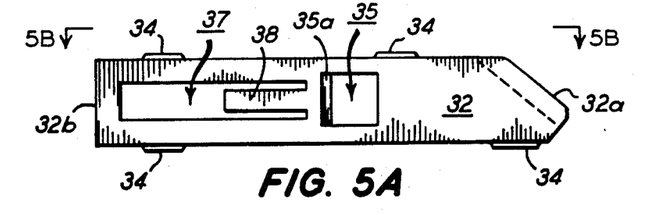
FIG. 5A is a top elevation of a disk latching member.
Figure 5B:
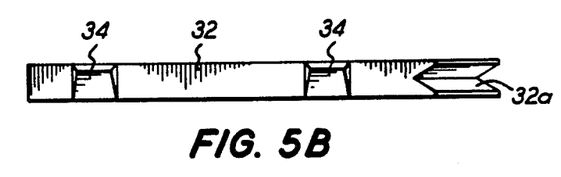
FIG. 5B is a side elevation of the FIG. 3 latching member.

Releasable latching means 30 peferably comprises a pair of movable latching members 32 which are slidably mounted in slots 33 defined by the carrier frame elements for movement in a direction which is generally perpendicular to the tangent T at point A of the disk periphery, i.e. the midpoint of the arc over which support means 20 provides support. Each latching member, as shown in FIGS. 5A and 5B, has a V-shaped latching edge 32a which is arcuately contoured to the shape of the disk periphery and serves to support an engaged disk from both sides. Both of the opposing lateral edges latching member 32 is provided with an integral pad 34 which facilitate sliding movement in slots 33. Also, each member 32 has a rectangular opening 35 having a chamfered edge 35a which is adapted to be engaged by the tapered edge 40a of a movable skewer 40 (associated with a disk-release mechanism disclosed in the aforementioned U.S. application) for the purpose of urging the latching member in a direction to unlatch and release the disk. As explained below, such unlatching movement of member 32 is resisted by a compression spring 36 which, in cooperation with certain carrier frame structure, biases the latching member 32 in the direction perpendicular to tangent T, towards a latching position in which edge 32a is in engagement with the disk periphery. Spring 36 is supported on member 32 by a limb 38 which extends into a slot 37 formed in the interior of member 32.

Figure 6A:
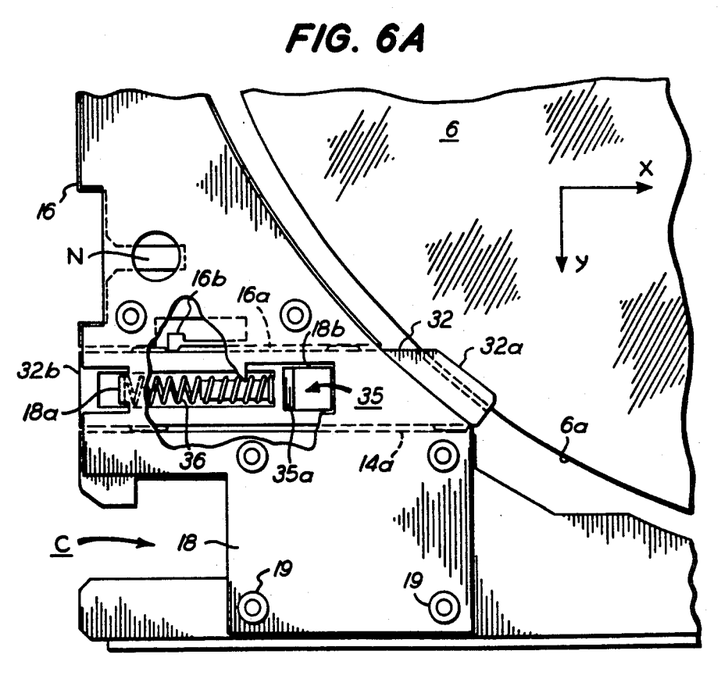
FIG. 6A and 6B are enlarged top plan views of a portion of the carrier illustrated in FIG. 2 showing the movement of the disk latching members.
Figure 6B:
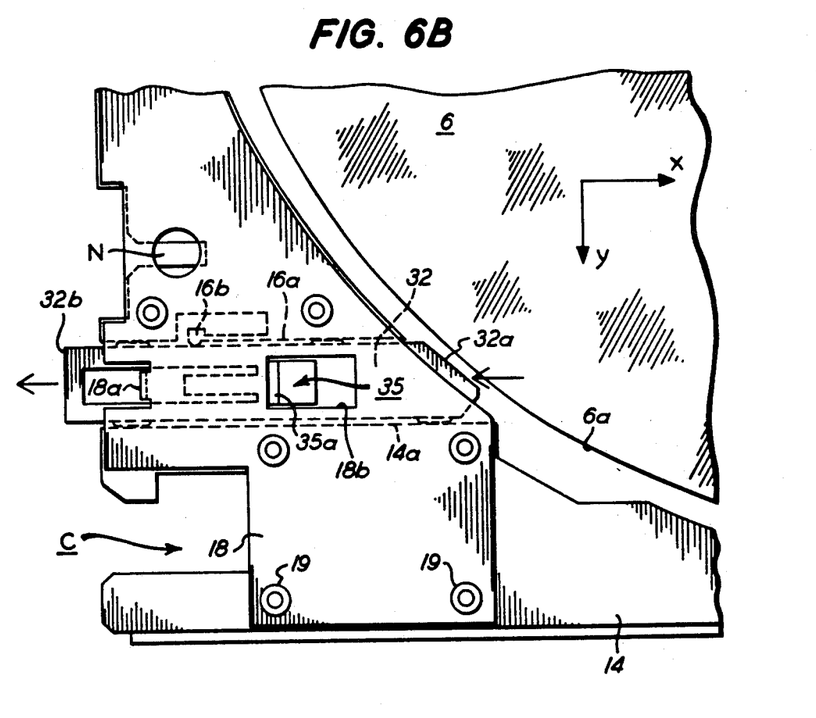

The operation of the latching member is best described with reference to FIGS. 6A and 6B. As shown, latching member 32 is slidably mounted in slot 33, defined by the spaced parallel edges 14a and 16a of frame elements 14 and 16, respectively. As indicated above, elements 14 and 16 are connected by a pair of opposing plates 18 which span members 14 and 16 on both sides of the carrier frame. In FIG. 6A, latching member 31 is shown in a latching position in which the arcuate, V-shaped latching edge 32a is engaged with the peripheral edge 6a of disk 6. Latching member 32 is maintained in this position by the biasing force provided by compression spring 36, one end of such spring engaging the forward end of slot 37 in latching member 32, and the other end being engaged by a pair of opposing bosses 18a extending into slot 33 from plates 18. Access to the latching member's rectangular aperture 35 by skewer 40 is had through slightly larger rectangular apertures 18b formed in the opposing carrier plates 18. As an unlatchng force, perpendicular to the plane of the drawing, is applied by skewer 40 to the chamfered edge 35a of aperture 35, the latching member is moved to its unlatching position, shown in FIG. 6B. To hold the latching members in slots 33 whenever the carrier is not being used to capture a disk, a stop member 16b is provided on carrier frame element 16. Such stop member cooperates with one of the sliding pads 34 to limit the forward movement of member 32.

Referring to FIG. 6A, it should be noted that, when the latching member 32 is in its latching position, its free end 32a is substantially coplanar with one edge 12a of the carrier frame. Whereas, when the latching member is in its unlatching position (FIG. 6B), the free end thereof extends substantially outwardly from such edge. By sizing the latching member 34 in such a manner, inadvertent unlatching of the latch is avoided while the carrier is positioned in the caddy. Note, while positioned in the caddy, carrier frame edge 12a is in contact with the inside of caddy wall 10a. Thus, any movement of the latch which would tend to unlatch the disk is resisted by the caddy wall.

Also to be noted in the design of carrier 8 is the fact that the spring latches function to urge the disk against a fixed disk support. By this arrangement, the disk can be precisely and repeatedly positioned in the carrier frame. This arrangement is to be contrasted with that disclosed in the aforementioned U.S. Pat. No. 4,433,410 in which the disk is supported by a plurality of spring-biased latches all of which apply radially directed forces. In such an arrangement, the spring force of each latch is pitted against the forces of all the other latches and, as the spring forces vary with time, the disk position shifts within the supporting cartridge. Moreover, in such prior art arrangement, each latch is mounted for movement in a radial direction and, since the restoring force emanates at the center of the disk, the unlatching force is resisted primarily by the bearing springs. In contrast, movement of the latching members in the carrier of the invention move in a non-radial direction, preferably perpendicular to tangent T at the midpoint of disk support 20. Here, the restoring forces act at an angle relative to the edges slot 33, and the thusly enhanced friction between the latching member 34 and slot edge 14a supplements the spring force in resisting the unlatching movement of the latch. Moreover this arrangement reduces the tolerances required in fabricating the latch slot 33.

In addition to the above-described disk-latching features of carrier 8, it is important to note certain additional features which facilitate the release of disk 6 from the carrier frame without substantial displacement of the disk. In carrier frame element 17, there are provided two rectangular openings 50 which are aligned with the unlatching, rectangular apertures 35 of latching members 31. As arranged, the rectangular openings 50 and 35 define a rectangular pattern. Like apertures 35, the rectangular apertures 50 are provided with a chamfered edge which is adapted to be engaged by the caming surface of a disk-release mechanism of the disk drive unit. Referring to FIG. 2, as the four disk-releasing skewers of the disk-releasing mechanism move in a downward direction, into engagement with the rectangular apertures 50 and 35, the latching members are moved to an unlatching position, as described above, and simultaneously therewith the carrier frame is moved in an opposite direction to free the disk periphery from engagement with the disk support means 20. Thus, the disk is simultaneouly freed from all support provided by the carrier, and the disk is thereby released without any substantial displacement in the X direction. Also to be noted is that by virtue of the positioning of the unlatching structure of the invention, the four disk releasing skewers of the disk drive unit can operate on the disk carrier to release the disk therefrom no matter which of the four different orientations the carrier can be inserted, and accurately positioned in the disk drive unit. That is, the carrier may enter the disk drive unit in the orientation shown in FIG. 2, or in upside down orientation derived by rotating the carrier 180° about the X axis, or in either of these orientations after the carrier has been similarly rotated about the Y axis.

From the foregoing description, it will be appreciated that a substantially improved disk carrier has been disclosed. Owing to the combination of fixed and movable retainers, a disk can be precisely located within the carrier and, hence, within the disk drive unit. Owing to the placement of the movable latches and apertures 50 a disk can be released from the carrier in four different orientations using the same disk releasing mechanisms, and the disk position is not substantially altered during releaser from the carrier. Moreover, by dimensioning the latches so that its non-latching end is coplanar with a carrier within a caddy, is substantially contiguous with an interior wall of the caddy, the chance for inadvertent release of the disk from the carrier can be reduced.

The invention has been described in detail with particular reference to preferred embodiments thereof, but it will be understood that variations and modifications can be effected within the spirit and scope of the invention.

We claim:

1. A carrier for receiving and releasably retaining a data-storage disk, said carrier comprising a planar frame having a wall defining a substantially circular aperature having a diameter slightly greater than the diameter of a data-storage disk to be received and retained by said carrier; and disk-retaining means mounted for releasably supporting, in the plane of said frame, a disk received within said aperature, said disk-retaining means comprising:

a. disk support means, extending rigidly from said wall at a location for supporting a disk urged into contact therewith along a first portion of the disk periphery;

b. releasable latching means slidably mounted on said frame for movement between a first position in which said latching means engages a disk within said aperature along a second portion of the disk periphery substantially spaced from said first portion, and urges the disk into supporting engagement with said disk support means, and a second position in which said latching means is sufficiently displaced from a disk within said aperature to allow such disk to be removed and displaced from said frame; and c. means for urging said latching means toward said first position, said frame comprising structure engagable by a disk-releasing mechanism for simultaneously urging said frame in a first direction tending to disengage said disk support means from said disk periphery while said slidably-mounted latching means is moved in an opposite second direction tending to disengage said latching means from said disk periphery, whereby a retained disk can be released from said carrier without substantial displacement of the disk relative to an initial position in the carrier.

2. The invention according to claim 1 wherein said latching means is constructed to urge such disk in a direction approximately perpendicular to a disk tangent passing approximately through the midpoint of said first portion of the disk periphery.

3. The invention as according to claim 1 wherein said frame structure and latching means are located to be engaged by the same disk-releasing mechanism whenever the disk is in any one of four different orientations relative to such mechanism.

4. The invention according to claim 1 wherein said latchng means comprises (i) a pair of slidably mounted latching members, each having a surface which is adapted to engage and support the 10 disk at its periphery, and (ii) means for urging each of said members in said predetermined direction to cause its disk engaging and supporting surface to move into engagement and supporting surface to move into engagement with a disk positioned within said aperture and engaged by said disk support means.

5. The invention according to claim 4, wherein said frame has a predetermined peripheral configuration defined by a plurality of edges, and wherein each of the slidably mounted latching members of said latching means moves between a latching position in which an end thereof is substantially coplanar with one of said carrier edges, and an unlatching position in which said end surface extends outwardly from said edge beyond said peripheral configuration.

6. The invention according to claim 9 wherein each of said movably-mounted members is slidably mounted in the plane of said frame and is adapted to move away from the disk periphery in 30 response to a force supplied in a direction substantially perpendicular to the plane of said frame.

* * * * *

UNITED STATES PATENT AND TRADEMARK OFFICE
CERTIFICATE OF CORRECTION

PATENT NO. : 4,773,061
DATED : September 20, 1988
INVENTOR(S) : Stark et al.

It is certified that error appears in the above-identified patent and that said Letters Patent are hereby corrected as shown below:

Column 6, line 60, "aperature" should read --aperture--.

Column 7, line 1, "aperature" should read --aperture--; line 6, "aperature" should read --aperture--.

Column 8, line 22, "claim 9" should read -- claim 4 --.

Signed and Sealed this

Eleventh Day of April, 1989

Attest:

DONALD J. QUIGG

Attesting Officer

Commissioner of Patents and Trademarks